(12) United States Patent
Rocha

(10) Patent No.: US 6,295,446 B1
(45) Date of Patent: Sep. 25, 2001

(54) METHOD AND APPARATUS TO DETECT FRAUDULENT CALLS IN A RADIO NETWORK

(75) Inventor: Roberto Rocha, Saltillo (MX)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/174,701

(22) Filed: Oct. 19, 1998

(51) Int. Cl.$^7$ ................................................. H04Q 7/00
(52) U.S. Cl. ................................................. 455/410; 455/411
(58) Field of Search ..................................... 455/410, 411

(56) References Cited

U.S. PATENT DOCUMENTS

| | | | |
|---|---|---|---|
| 5,777,558 | * 7/1998 | Pennypacker et al. | 340/635 |
| 5,822,691 | * 10/1998 | Hosseini | 455/410 |
| 5,950,121 | * 9/1999 | Kaminsky et al. | 455/410 |
| 5,960,338 | * 9/1999 | Foti | 455/405 |
| 5,991,617 | * 11/1999 | Powell | 455/410 |
| 6,035,043 | * 3/2000 | Sansone et al. | 380/49 |

FOREIGN PATENT DOCUMENTS

| | | |
|---|---|---|
| 0 656 733 A2 | 6/1995 | (EP) . |
| WO 96/15643 | 5/1996 | (WO) . |
| WO 98/31175 | 7/1998 | (WO) . |
| WO 98/31178 | 7/1998 | (WO) . |

* cited by examiner

Primary Examiner—Daniel Hunter
Assistant Examiner—Alan T. Gantt
(74) Attorney, Agent, or Firm—Jenkens & Gulchrist

(57) ABSTRACT

An apparatus for detecting fraud in a radio network includes a Mobile Station (MS) having a nonvolatile memory to store an electronic identification number and a first calling event table. The invention also includes a Mobile Switching Station (MSC) or Home Location Register (HLR) having a second calling event table that contains a mirror image of the first calling event table (if no fraud has occurred). Each calling event table contains outgoing call event data for the MS. The invention also includes a method for detecting fraud in a radio network comprising the steps of retrieving calling event data from the MSC for the MS; querying the MS using the retrieved calling event data; sending a response message from the MS to the MSC; comparing the query data to the response message; and detecting fraud if the calling event data does not match the response message.

20 Claims, 5 Drawing Sheets

MOBILE STATION HISTORICAL CALL EVENT DATA

| INDEX | Number Dialed | Date | Time | Duration | Other |
|---|---|---|---|---|---|
| 1 | 2340001 | 971213 | 19:20 | 3:05 | |
| ②~44 | 2340999 | 971213 | 11:17 | 1:02 | |
| . | | | | | |
| . | ~47 | | | | |
| ㊿~32 | 2345234 | 971202 | 09:56 | 2:04 | |

*FIG. 2A*

MOBILE SWITCHING CENTER HISTORICAL CALL EVENT DATA

| ESN | INDEX | Number Dialed | Date | Time | Duration | Other |
|---|---|---|---|---|---|---|
| 237666 | 1 | 2340001 | 971213 | 19:20 | 3:05 | |
| 237666 | ②~43 | 2340999 | 971213 | 11:17 | 1:02 | |
| 237666 | . | | | | | |
| 237666 | . | | | | | |
| 237666 | ㊿~46 | 2345234 | 971202 | 09:56 | 2:04 | |

*FIG. 2B*

MOBILE STATION HISTORICAL CALL EVENT DATA

| INDEX | Number Dialed | Date | Time | Duration | Other |
|---|---|---|---|---|---|
| ①~48 | 2340001 | 971213 | 19:20 | 3:05 | |
| ②~49 | 2340999 | 971213 | 11:17 | 1:02 | |
| 3 | 7898888 | 971213 | 09:45 | 48:35 | |
| . | | | | | |
| 50~51 | 5553333 | 971211 | 18:22 | 52:04 | |

*FIG. 5A*

MOBILE SWITCHING CENTER HISTORICAL CALL EVENT DATA

| ESN | INDEX | Number Dialed | Date | Time | Duration | Other |
|---|---|---|---|---|---|---|
| 237666 | ①~48 | 2340001 | 971213 | 19:20 | 3:05 | |
| 237666 | ②~49 | 2340999 | 971213 | 11:17 | 1:02 | |
| 237666 | 3 | 2340999 | 971213 | 06:03 | 5:01 | |
| 237666 | . | | | | | |
| 237666 | 50~51 | 2345234 | 971202 | 09:56 | 2:04 | |

*FIG. 5B*

METHOD AND APPARATUS TO DETECT FRAUDULENT CALLS IN A RADIO NETWORK

BACKGROUND OF THE INVENTION

1. Technical Field

This invention relates to radio telecommunications networks in general and, more particularly, to a method and apparatus for detecting fraudulent telephone usage within such a system.

2. History of Related Art

Fraud has been identified as one of the cellular telephone industry's biggest problems. Because of fraud, the annual global loss in revenue now exceeds $1 billion. This amount does not account for indirect fraud costs, which include anti-fraud in-house personnel teams, the cost of anti-fraud equipment, and the negative impact such fraud has on wary potential subscribers.

Fraud appears in many forms, and new methods of committing fraud are conceived on almost a daily basis. Criminals who steal cellular phone services enjoy anonymity and other benefits, such as the ability to make an unlimited number of free calls, income from selling long-distance services at reduced rates, and the ability to bypass regulations that prohibit communications between certain countries.

Cellular systems are vulnerable to fraud at several points in the network. To date, the elements most frequently used to steal services are the phone itself, the radio interface, and the signaling network. Methods used to defeat the fraudulent use of telephone services are often frustrated by publication of the methods themselves. In fact, the Internet is a popular forum for fraudsters who, in a matter of minutes, are able to post detailed instructions to a global audience on how telephone fraud may be committed.

One of the most popular, and difficult to detect, methods of fraud is cloning, which can be described as the complete duplication of a legitimate mobile terminal, including the mobile identification number (MIN), the electronic serial number (ESN) and, in some cases, the subscriber's personal identification number (PIN). When cellular systems cannot distinguish between a clone and a legitimate subscriber, cloned telephones successfully pass pre-call validation checks, allowing fraudulent use that is billed to legitimate subscribers. In many cases, fraudulent calling activity is not detected until after thousands of dollars of non-recoverable calling charges have accrued.

The MIN-ESN represents a unique combination that may be used to validate a legitimate subscription. When a subscription is activated for the first time, the MIN-ESN are stored in the operator's database, or home location register (HLR). From that time onward, each access request to the MSC by the mobile terminal triggers a matching check by the MSC with the numbers received from the HLR. If the MIN-ESN transmitted by the phone matches the HLR data, then the MSC processes the access request.

The most common way of obtaining MIN-ESN combinations for use in cloning cellular phones is the theft of subscriber data from the operator, via interception, using a frequency scanner over the air interface. Since the MIN-ESN combination is transmitted on the air interface control channel whenever a mobile terminal registers with a Mobile Switching Center (MSC) or initiates/receives a call, the MIN-ESN combination is fairly easy to retrieve. One, if not many, cellular phones can easily be reprogrammed to use new MIN-ESN combinations.

Therefore, a method and apparatus capable of defeating cloned cellular telephone operations which make use of stolen MIN-ESN combinations is desirable. Further, it is also desirable to have a method and apparatus of defeating fraudulent cellular telephone operations which make use of stolen PINs.

SUMMARY OF THE INVENTION

In accord with one aspect of the present invention, an apparatus for detecting fraud in a radio network includes a Mobile Station (MS) having a nonvolatile memory to store an electronic identification number and a first calling event table. The nonvolatile memory may be battery-backed random access memory, electrically-erasable programmable read-only memory, or other types well known in the art. The apparatus also includes a MSC or HLR having a second calling event table that contains a mirror image of the first calling event table, as long as no fraud has occurred.

The first and second calling event tables contain identifying information for MS calling activity, such as outgoing call information, which may comprise a called number, a call time, a call duration, and/or a call date. The first and second calling event tables are updated with each outgoing call, and authorization to make future calls is based on conditioned correspondence between the information contained in each calling event table.

The nature of the information stored in the tables makes it very difficult for the fraudster to duplicate the content of the first calling event table in the cloned phone. A mismatch in table information (between the first and second calling event tables) is determined during an interrogation process that begins when the clone attempts to initiate a call, and, upon detection of the mismatch by the MSC or HLR, the fraudulent call connection is prevented.

The method for detecting fraud within a radio network begins when the MS initiates a call through the MSC. First, calling event data within the MSC or HLR is retrieved for the calling MS (from the second calling event table). Second, one or more queries based on the retrieved calling event data are sent to the MS to determine whether the first calling event table in the MS contains data that matches the contents of the second calling event table. Third, a response message containing the MS calling event data is sent from the MS to the MSC/HLR, and compared with the MSC/HLR query calling event data. If the data are equal, then the call can be completed. Call data, queries, and comparisons can be maintained and conducted within a MSC, a HLR, or by using some combination of a MSC and a HLR.

Any mismatch between data in the first and second calling event tables results in preventing the MS from being used to make calls in conjunction with the MSC. Such a mismatch indicates fraudulent cloning of a MS with a stolen MIN-ESN combination. Even if one or two events from the table are intercepted by fraudsters, as further calling event table updates occur, so as to provide some matching data within the calling event tables, the MSC or HLR query may include data for several events within the tables, selected in sequence, or randomly, such that only a complete copy of the table contents will enable a successful cloning operation.

BRIEF DESCRIPTION OF THE DRAWINGS

A more complete understanding of the structure and operation of the present invention may be had by reference to the following detailed description when taken in conjunction with the accompanying drawings, wherein:

FIGS. 2A and 2B are tables which illustrate exemplary contents of the first and second calling event tables, respectively, when no fraud has occurred;

FIGS. 5A and 5B are tables which illustrate exemplary contents of the first and second calling event tables, respectively, when fraud has occurred.

DETAILED DESCRIPTION OF PRESENTLY PREFERRED EXEMPLARY EMBODIMENTS

The present invention includes an apparatus and method for limiting fraudulent telephone calls in a radio network which involves collection of historical data by the network and by individual cellular telephones operating within the network. The data collected by the apparatus illustrated in the schematic block diagram of FIG. 1 may be similar to, or identical to, that shown in FIGS. 2A and 2B, which depict a series of events directly related to outgoing calls made by an individual cellular phone, or MS operator.

Figure 1:
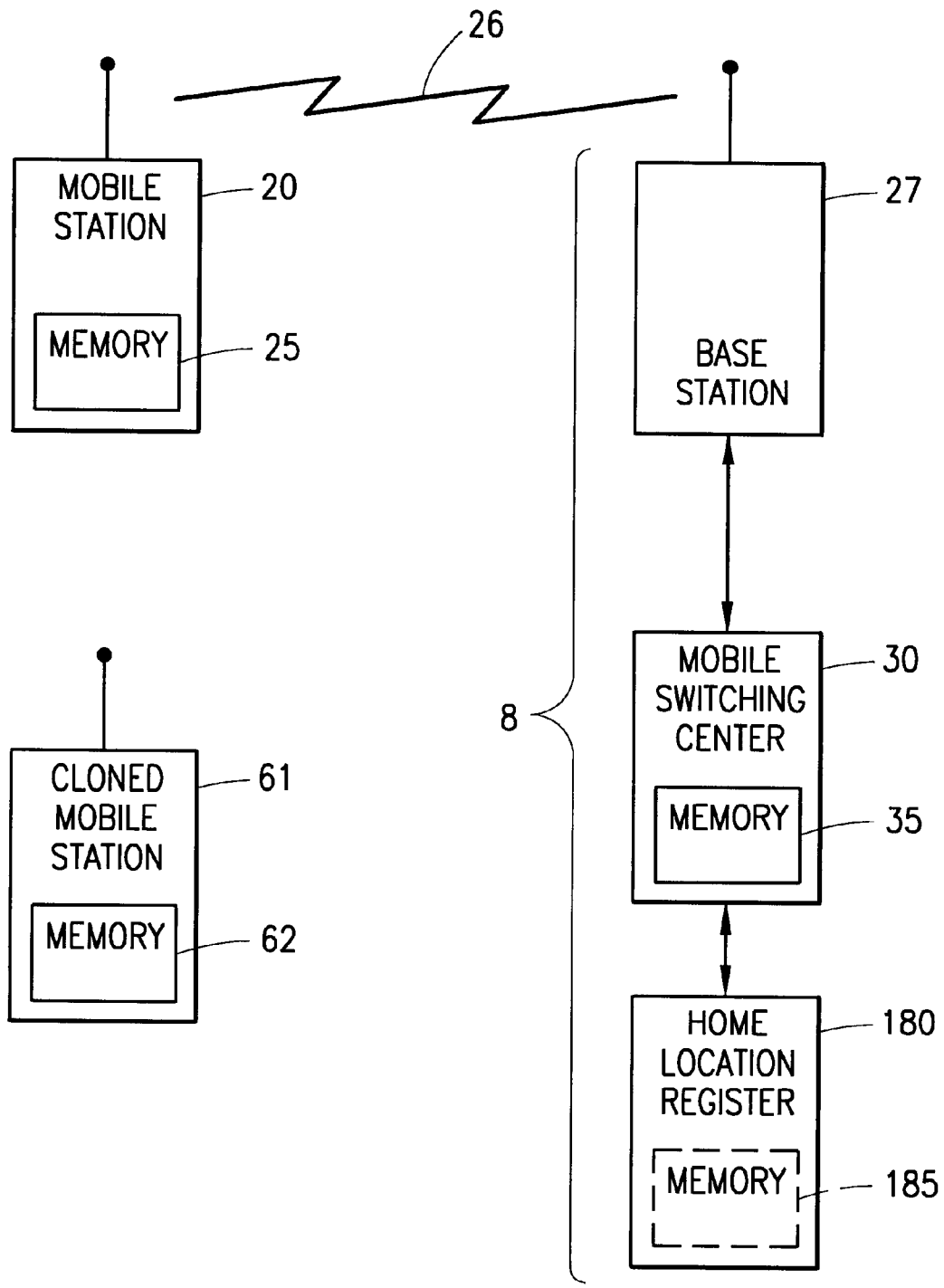
FIG. 1 is a schematic block diagram of the apparatus of the present invention.

As can be seen in FIG. 1, the apparatus of the present invention comprises a radio network 8, including a MS 20 having a nonvolatile memory 25. The first calling event table, which may be identical to, or similar to, the table of FIG. 2A, is stored in the memory 25.

The MS 20 is in electronic communication with the MSC 30, via radio waves 26 and the base station 27, as part of the radio network 8. The MSC 30 has a non-volatile memory 35, containing a second calling event table for the MS 20, which in turn contains a mirror image (normally) of the first calling event table. The contents of the second calling event table may be identical to, or similar to, the table shown in FIG. 2B. A HLR 180, linked to the MSC 30, may alternatively have a non-volatile memory 185 that is used to contain the second calling event table. Thus, the second calling event table may be resident in either the MSC 30 or the HLR 180, or both.

Referring now to the first calling event table of FIG. 2A, an index number 31 is assigned to each outgoing call made by the cellular phone, up to some maximum number of calling events (e.g. fifty) 32. Each outgoing call, or event, is characterized by the number dialed 33, the date on which the call was made 34, the time of the call 36, the duration of the call 37, and/or other identifying information 38, such as the user PIN, and the like. FIG. 2B depicts the information collected by the memory 35 in the network MSC 30 (or the memory 185 in the HLR 180, or both) which corresponds to the MS 20 memory 25 data shown in FIG. 2A. As illustrated, all of the data shown in FIG. 2A is contained in the memory 35 (or the memory 185) used to store the data shown in FIG. 2B, except for the addition of an ESN 41 which identifies a particular MS. That is, the ESN 41 may also be part of the identifying link between the MS 20 hardware and the network hardware (i.e., MSC 30 or HLR 180). Therefore, the apparatus of the present invention requires both the MS 20 and the network to have a means (e.g. memories 25, 35, and/or 185) of storing a finite and predetermined number of historical data events, with searching capabilities on the stored data. In addition, the data must be non-volatile, so that the loss of battery or electric power leaves the data in the first and second calling event tables intact. Non-volatile memories 25, 35, and 185 may exist in the form of battery-backed random access memory, electrically-erasable programmable read-only memory, subscriber identification module cards, disk or tape drives, or similar devices.

Figure 3:
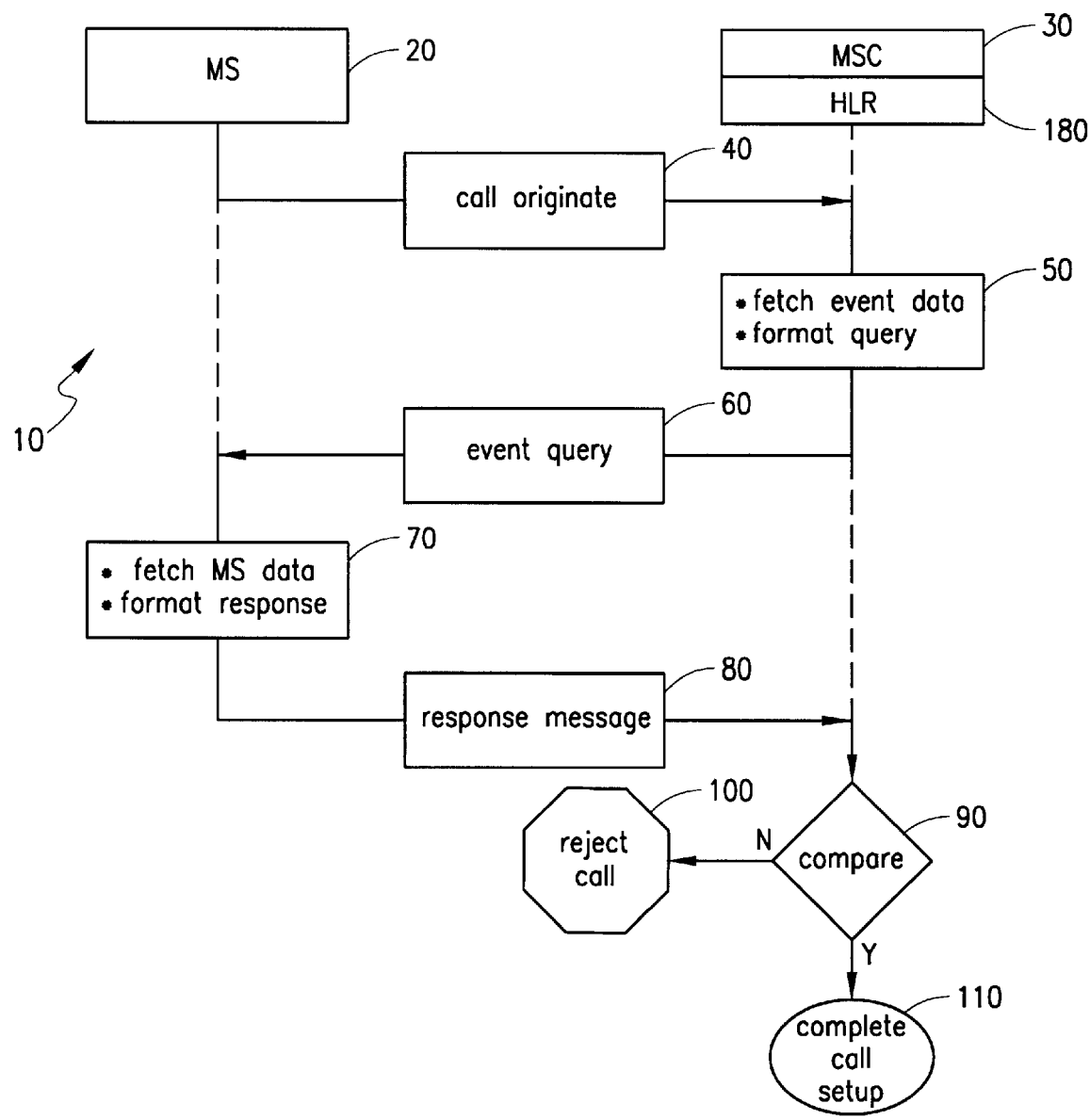
FIG. 3 is a flow chart illustrating the steps of subscriber fraud detection embodied in the present invention.

FIG. 3 depicts an operational flow chart illustrating the method of the present invention. Within the radio network fraud detection method 10, a mobile station (MS) 20 originates a call by sending a call set-up request 40, which includes the ESN of the MS 20, to the MSC 30. The MSC 30 may access one or more events, in sequence or at random, from the historical data stored in the second calling event table (illustrated in FIG. 2B) corresponding to the ESN 42 that matches the ESN sent by the MS 20.

After the accessed event data is fetched and formatted into a query 50, a formatted calling event query 60 is sent to the MS 20. In return, the MS 20 fetches data which corresponds to the calling event query 60, formats it at step 70, and a calling event response message 80 is sent to the MSC 30.

The MSC 30 compares at step 90 the calling event query 60 and the calling event response message 80. If the query 60 and response message 80 do not match, then the call is rejected 100 and the signaling channel is reallocated. If the query 60 matches the response message 80, then the call is allowed to complete.

For example, the calling event query 60 may consist of asking the MS 20 "What was the number that you dialed on Dec. 13, 1997 at 11:17?" (refer to FIG. 2B, event 43). The MS 20 must respond to the MSC 30 by way of the calling event response message 80 that the number was "2340999," (refer to FIG. 2A, event 44) or the call is rejected. Otherwise, if the calling event data from the first calling event table (tabular data in FIG. 2A) and the second calling event table (tabular data in FIG. 2B) match, call setup, including any other authentication procedures and equipment identification, is completed in step 110.

A second example may be that the MSC 30 interrogates the MS 20 by way of the calling event query 60 as to "What was the number dialed at your recorded index number position of fifty?" (refer to FIG. 2B, event 46) The MS 20 must answer to the MSC 30 by way of the calling event response message 80 that the number was "2345234" (refer to FIG. 2A, event 47). Again, if the proper answer is not elicited (i.e., no match), the call is rejected 100.

Figure 4:
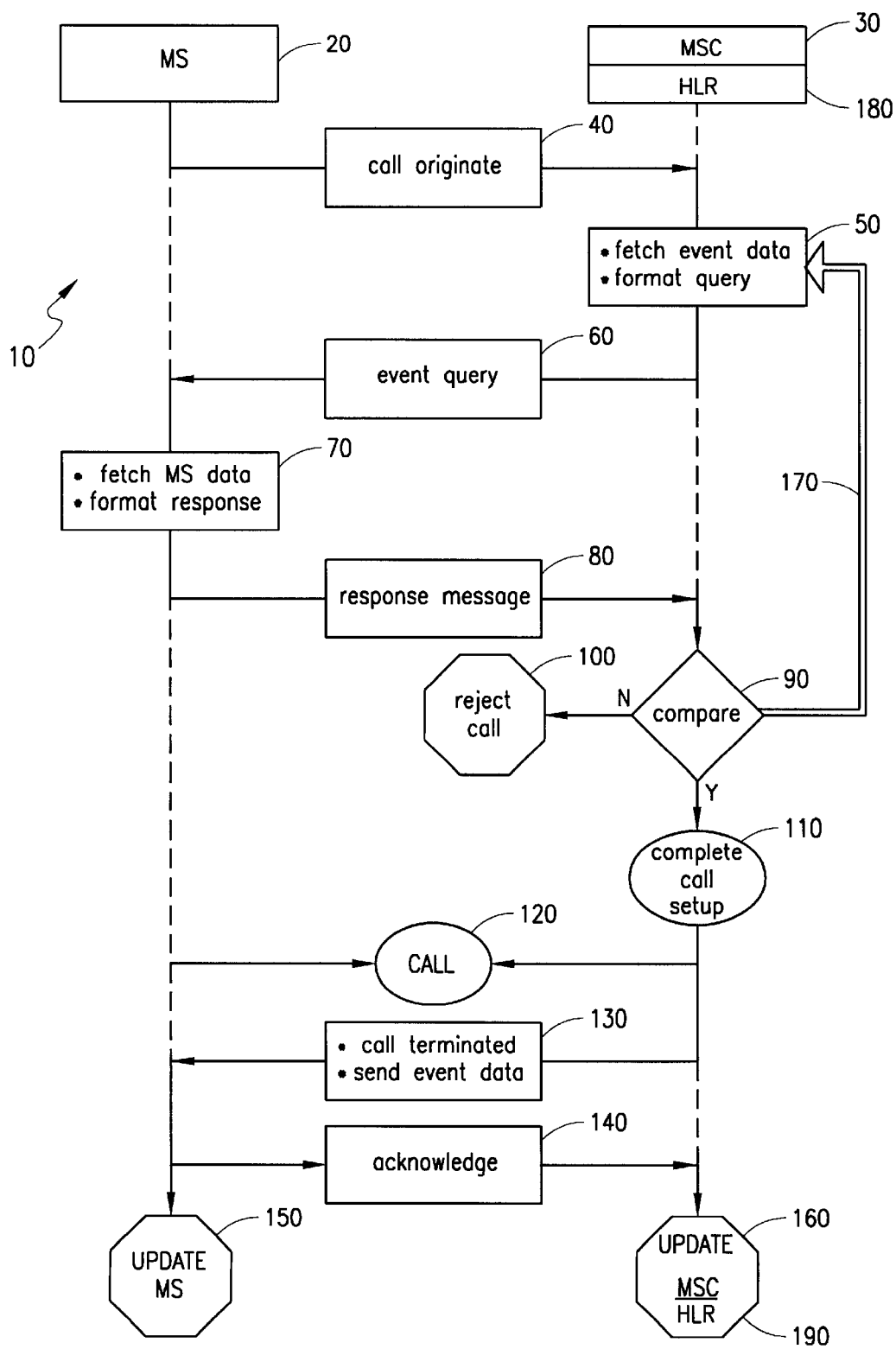
FIG. 4 is a flow chart illustrating the steps of subscriber fraud detection and data updating embodied in the present invention.

Turning now to FIG. 4, a flow chart of the call completion sequence, along with database or memory updating, is shown. In this case, if the call setup is completed 110, then the complete connection is established after the traffic channel is allocated. At this time the actual call 120 occurs.

Once the call 120 is complete, the call is terminated and the MSC 30 acts to send updated historical calling event data 130 to the MS 20. Once the call is terminated and new calling event data is sent 130, the MS 20 acknowledges data receipt 140 from the MSC 30, and the MS 20 updates the MS 20 calling event table 150 (i.e. the first calling event table). The receipt of the acknowledge data message 140 from the MS 20 by the MSC 30 causes the MSC 30 to update the MSC calling event table 160 (i.e. the second calling event table).

In the case of the example tables illustrated in FIGS. 2A and 2B, all of the relevant updated outgoing call information data is loaded into the first index number position after index number positions forty-nine through one are moved into positions fifty through two, respectively. At this point, both memories (i.e., 25 and 35) contain identical calling event information, as of the last completed call. Of course, any method or order of updating index number position data in the tables is allowed, as long as the end result includes matching data contents in both tables for all index number positions. For example, only a first portion of each table may be updated (e.g. index position numbers one through twentyfive), while a second portion of the tables are left unchanged (e.g. index position numbers twenty-six through fifty).

To further clarify the operation of the apparatus and method of the present invention, several variations in the embodiment just described should be noted. First, the calling event query 60 and calling event response message 80 may be repeated for several events, as in a query and response loop 170, so that the probability of legitimate subscriber use is greatly increased. That is, a cloned phone which possesses the MIN-ESN number, and even the PIN of a particular subscriber will, most likely, not have a record of any more than the most recent calling event/outgoing call made by the cloned phone. Second, if random event selection is used to build queries within the MSC 30, any thief determined to clone a phone is required to obtain almost all of the calling event information for any particular subscriber before being accepted as legitimate by the MSC 30. Finally, if the number of queries and responses in the query and response loop 170 are unknown, or varied from call-to-call, it is virtually impossible for a cloned phone to become accepted as a legitimate subscriber.

An idea of the problems a fraudster faces when attempting to defeat the protection provided by the present invention can be seen by referring to FIGS. 5A and 5B, wherein the first and second calling event tables are shown after the MS 20 has been cloned by cloned MS 61 (see FIG. 1). FIG. 5A details the cloned MS 61 memory 62 content, while FIG. 5B details the MSC 30 memory 35 content. In this case, the fraudster has successfully captured the last two calling event transactions for the cloned MS 61 (see events 48 and 49 in FIG. 5B), and coded them into the nonvolatile memory 62 of the cloned MS 61 (see events 48 and 49 in FIG. 5A). However, since the information was not sent out over the air until several hours (or days) earlier, the fraudster was not able to recover the calling event information for transaction events three through fifty (see events 51 in FIGS. 5A and 5B). The table shown in FIG. 5A clearly indicates that the MS used to clone the MS 20 is a different phone. That is, even though the MS clone makes use of the present invention, it can not be operated by a fraudulent subscriber.

Up to this point in the discussion of the method, it has been assumed that updated network calling event tables are maintained within the MSC 30. However, they may just as easily be maintained within the memory 185 of a remote HLR 180 which is linked to the MSC 30, as shown in FIGS. 1 and 4. In this case, instead of updating the second calling event table contained in the memory 35 within the MSC 30, a corresponding calling event table contained in the memory 185 within the HLR 180 is updated 190 after the acknowledge data message 140 is received by the MSC 30. Information from the second calling event table may also be downloaded, upon request, from the HLR 180 memory 185 to the MSC 30 memory 35 as required. For example, single events, multiple events, or even an entire calling event table may be sent by the HLR 180 to the MSC 30 to support various calling event queries 60 posed by the MSC 30 to the MS 20.

In the case of a remotely located HLR 180, several aspects in the implementation of the method of the invention are changed. First, the MSC 30 must request data from the calling event table maintained in the HLR 180 for use in formulating a calling event query 60 to the MS 20. One or more events, chosen in sequence or at random, are requested from the HLR 180 by the MSC 30 for use in formulating one or more calling event queries 60. Once the event data has been retrieved from the HLR 180, the method proceeds as described above until the call termination is acknowledged 140 by the MS 20. At that time, the MS 20 updates the MS calling event table 150 in the normal fashion, but the MSC 30 sends a message and current calling event data to the HLR 180 for updating 190 the HLR outgoing calling event table for the MS 20 (instead of updating the memory 35 content within the MSC 30).

Whenever a cellular phone is used for the first time, a default calling event table may be predetermined by the service provider and downloaded to the phone, or the first call from an inactive phone may be placed with a service provider for verification of basic phone operation and uploading of the calling event table maintained within the telephone.

Roaming telephone users can always be verified against the calling event data held by the HLR 180. However, roamers operating out of the country may not have HLR data available for verification. Such international activity may require agreements between operators in different countries to allow cross-verification between switches in each of the respective countries.

Although the invention has been described with reference to specific embodiments, this description is not meant to be construed in a limited sense. The various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention, or their equivalents.

What is claimed is:

1. An apparatus for detecting fraud in a radio network comprising:
    a mobile station including a nonvolatile memory storing an electronic identification number and a first table including a plurality of entries, each entry relating to a prior mobile station calling event; and
    a mobile switching center in radio communication with the mobile station, the mobile switching center including a memory storing a second table including a plurality of entries, each entry relating to a prior calling event for that mobile station, the mobile switching center operable to make a calling event query to the mobile station requesting the content of a selected one of the plural entries on the first table, compare a calling event response message containing the first table content of the selected entry that is received from the mobile station responsive to the calling event query with the content of a corresponding entry on the second table, and detect mobile station fraud when the content does not match.

2. The fraud detection apparatus of claim 1, wherein said nonvolatile memory is battery-backed random access memory.

3. The fraud detection apparatus of claim 1, wherein said nonvolatile memory is electrically-erasable programmable read-only memory.

4. The fraud detection apparatus of claim 1, wherein the first table entries include call information for the mobile station.

5. The fraud detection apparatus of claim 4, wherein the call information comprises at least one of the following data items: a call time, a call duration, a call date.

6. The fraud detection apparatus of claim 1, wherein the second table entries include call information for the mobile station.

7. The fraud detection apparatus of claim 1, wherein the calling event query requests mobile station call information comprising at least one of the following data items: a call time, a call duration, a call date.

8. An apparatus for detecting fraud in a radio network comprising:
- a mobile station including a nonvolatile memory storing an electronic identification number and a first table including a plurality of entries, each entry relating to a prior mobile station calling event;
- a home location register including a memory storing a second table including a plurality of entries, each entry relating to a prior calling event for that mobile station; and
- a mobile switching center in radio communication with the mobile station and connected to the home location register, wherein the mobile switching center is adapted to make a calling event query to the mobile station as to the content of a plurality of randomly selected entries in the first table, compare a calling event response message containing the first table content of the plural randomly selected entries that is received from the mobile station responsive to the calling event query with the content of corresponding plural entries in the second table, and detect mobile station fraud when the content from each plural entry does not match.

9. The fraud detection apparatus of claim 8, wherein the nonvolatile memory is battery-backed random access memory.

10. The fraud detection apparatus of claim 8, wherein the nonvolatile memory is electrically-erasable programmable read-only memory.

11. The fraud detection apparatus of claim 8, wherein the first table entries include call information for the mobile station.

12. The fraud detection apparatus of claim 8, wherein the call information comprises at least one of the following data items: a call time, a call duration, a call date.

13. The fraud detection apparatus of claim 8, wherein the second table entries include call information for the mobile station.

14. The fraud detection apparatus of claim 13, wherein the second calling event query requests mobile station call information comprising at least one of the following data items: a call time, a call duration, a call date.

15. A method for detecting fraud in a radio network having a mobile station including a nonvolatile memory storing a first table including a plurality of mobile station calling events, said mobile station in communication with the radio network including a memory storing a second table including a plurality of calling events for that mobile station, comprising the steps of:
- querying the mobile station with a calling event query as to the content of a plurality of randomly selected entries in the first table;
- retrieving by the mobile station of the plural entry content responsive to the calling event query from the first table;
- sending by the mobile station of a calling event response message including said retrieved plural entry content from the first table;
- retrieving by the radio network from the second table the plural entry content corresponding to the calling event query;
- comparing the received content to the retrieved content; and
- detecting fraud when the received and retrieved content for each of the plural entries does not match.

16. The method of claim 15, wherein the content is calling event data for said mobile station.

17. The method of claim 15, further comprising the steps of:
- initiating a call from the mobile station to the mobile switching station; and
- completing the call from the mobile station to the radio network when the received and retrieved content matches.

18. The method of claim 15, wherein the second table includes entries for call information for the mobile station.

19. The method of claim 18, wherein the call information comprises at least one of the following data items: a call time, a call duration, a call date.

20. The apparatus of claim 1, wherein the mobile switching center is operable to make a calling event query to the mobile station requesting the content of a randomly selected one of the plural entries on the first table, compare a calling event response message containing the first table content of the randomly selected entry that is received from the mobile station responsive to the calling event query with the content of a corresponding entry on the second table, and detect mobile station fraud when the content does not match.

* * * * *